May 31, 1927.
R. VARLEY
MAGNETO
Filed Aug. 14, 1924
1,630,645
2 Sheets-Sheet 1
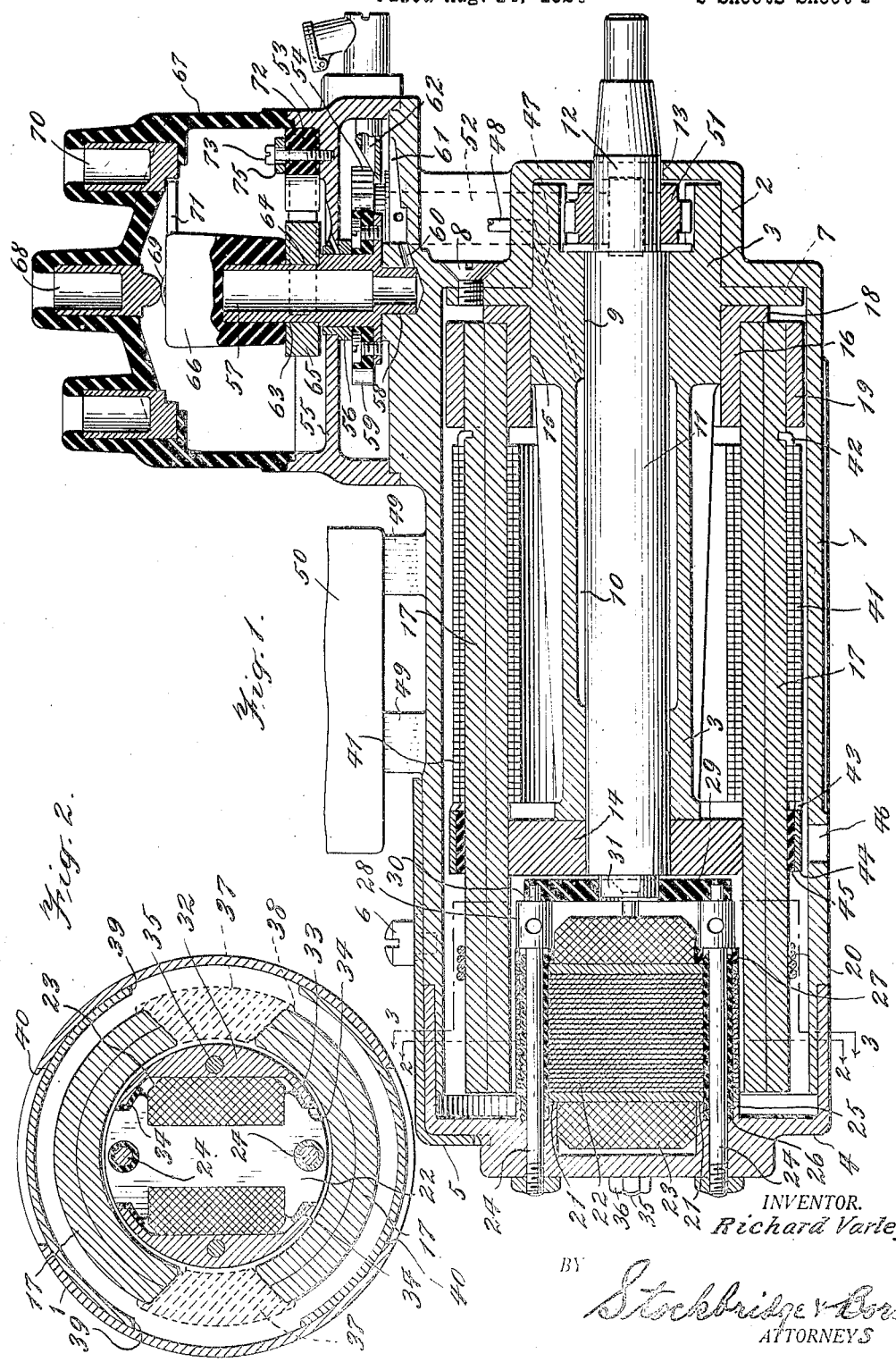
INVENTOR.
Richard Varley
BY
Stockbridge & Borst
ATTORNEYS May 31, 1927.

R. VARLEY 1,630,645

MAGNETO

Filed Aug. 14, 1924

INVENTOR.
Richard Varley.

BY
Stockbridge & Borst
ATTORNEYS.

Patented May 31, 1927.

1,630,645

UNITED STATES PATENT OFFICE.

RICHARD VARLEY, OF ENGLEWOOD, NEW JERSEY, ASSIGNOR TO VARLEY DUPLEX MAGNET COMPANY, A CORPORATION OF NEW JERSEY.

MAGNETO.

Application filed August 14, 1924. Serial No. 731,957.

My invention relates to magneto generators of the type suitable for use in ignition systems of internal combustion engines. While it is well recognized that there are many advantages in the type in which magnets are rotated about a stator armature over the usual type of magneto in which the field member is stationary and the armature rotated, there have been practical reasons why magnetos of the rotative magnet type have been unsuitable for use with internal combustion engines, due to their proportions as well as their design.

An object of this invention is to provide an improved magneto generator which will have all of the advantages of the type using a relatively stationary winding with a moving magnetic field, and at the same time will be so proportioned and constructed that it can be embodied in a casing of approximately the dimensions of the usual magneto casing; which will deliver the desired amount of current; in which the air gap may be kept relatively small and uniform in length; and which will be practical, simple, efficient, durable, compact and relatively inexpensive.

A further object is to provide an improved magneto in which the magnetization or remagnetization of the permanent magnets may be accomplished readily and rapidly in a few moments of time without the removal of the magnets; and in which the magneto may be assembled or disassembled without material loss of magnetism in the permanent magnets. A further object is to provide an improved magneto with which the use of the usual timing mechanism is unnecessary, but having a simple current make and break mechanism which may be used when the engine is operated from a battery such as in starting the engine. Various other objects and advantages will be apparent from the following description of an embodiment of the invention, and I will particularly point out and claim the novel features hereinafter in the appended claims.

In embodiments of my invention the horseshoe magnet rotates upon its central longitudinal axis about a stator armature in the open end of the magnet. The shaft bears in an elongated bearing extending well within the magnet and is attached at its inner end by radial extensions to the magnet bars at points intermediate their ends and preferably as close as possible to the open end. The closed end of the magnet may also have a circular bearing portion surrounding and bearing externally upon the elongated bearing for the shaft, thereby assuring rigidity of the magnet in its rotation and a minimum of variation in the air gaps between the magnet ends and the stator core. This accuracy in alignment may be further augmented by rigidly mounting the stator core upon a metal support attached to the support for the elongated bearing. A satisfactory construction is one in which the parts have a cylindrical casing with one end of which the elongated bearing is either integral, or to which it is rigidly attached, the stator being attached to a metal cap fitting upon the other end of the casing. In this way provision may conveniently be made for angularly adjusting the stator within the rotative field to vary the instant of maximum voltage relative to the cycle of the engine. Also if desired the end of one axis may bear in the adjacent end of the other to further assure alignment. The invention also comprehends various details of construction which will be explained in connection with the following description of one embodiment of the invention.

In the accompanying drawings:—

Fig. 1 is a sectional elevation of a magneto constructed in accordance with the invention;

Fig. 2 is a transverse sectional elevation of the same with the section taken substantially along the line 2—2 of Fig. 1;

Figures 3, 4:
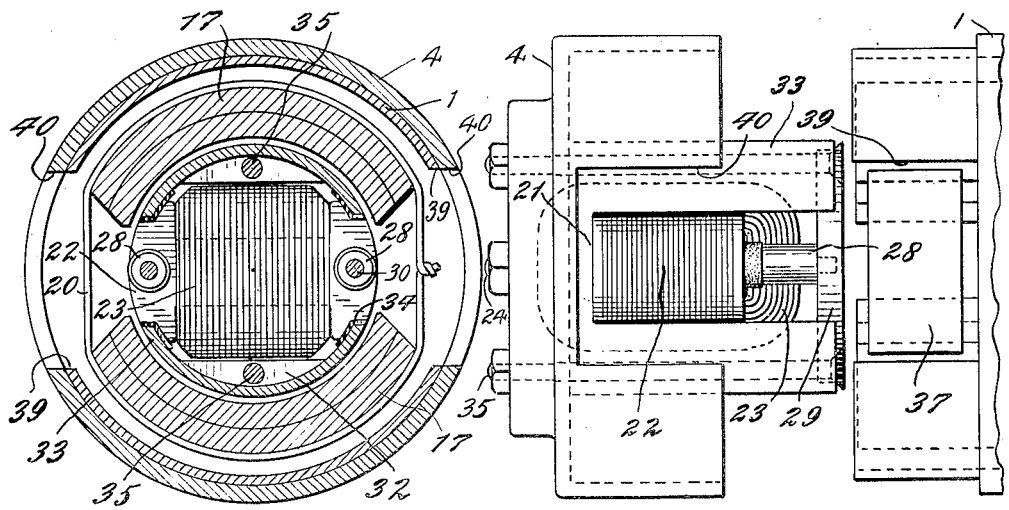
Fig. 3 is another transverse sectional elevation through the same with the section taken substantially along the line 3—3 of Fig. 1 and with the parts in a slightly different relative position than in Fig. 2.
Fig. 4 is a sectional plan of one end of the magneto with a portion of the same ready for insertion into operative position in the casing.

In the illustrated embodiment of the invention, a tubular casing 1 is provided at one end with a reduced tubular extension 2 which forms a support for one end of a bearing element 3 that is mounted within the casing as will be explained presently. The casing at its other end is open and provided with a removable flanged cap 4 which is rotatable upon the end of the casing, and also slidable thereon for removal or attachment. The cap is removably secured in telescopic relation with the open end of the casing in any desired manner such as by a latch or hook plate 5 which engages with the cap and is secured to the casing body, such as by a screw 6.

Within the casing, the bearing element 3 is provided with a flange 7 which fits against the shoulder formed by the end wall between the periphery of the casing and the reduced extension 2, the flange being secured thereagainst in a suitable manner such as by one or more screws 8 passing through the casing wall and having threaded engagement with the flange. The bearing element 3 extends for a considerable distance lengthwise of the casing and is provided with a central bearing bore 9 which, intermediate of its ends, is cut away or enlarged as at 10 to form an oil cavity, thus providing in effect two spaced bearing surfaces near its opposite ends. A shaft 11 is rotatably mounted in the bore 9 and extends from both ends thereof, one reduced end portion 12 thereof extending through an aperture 13 in the end wall of the reduced extension 2 of the casing, so as to mount a suitable driving element (not shown) by which the shaft may be driven from the engine at a suitable ratio of speed relatively thereto. The other end of the shaft 11 carries a support or disc 14 of non-flux conducting material, fixed thereon and abutting against the inner end face of the bearing element 3.

The bearing element 3 is provided with a peripheral bearing surface 15 at the end adjacent the flange 7, and upon this bearing surface a ring 16 is rotatably mounted. A pair of permanent magnet bars 17, substantially straight in length, are secured in diametrically opposite relation upon the support 14 and the ring 16, so as to extend endwise of the casing in substantially parallel relation to one another with end portions projecting into proximity to the cap 4 for a purpose which will appear presently.

The magnet bars may be of any suitable magnet steel or material and may be secured in any suitable manner (not shown) to the support 14 and the ring 16. The ring 16 is made of good magnetic flux conducting material such as soft iron or steel and preferably has an end flange 18 at least partially abutting the ends of the magnet bars so that the ring will form a complete magnetic path between the two adjacent ends of the magnet bars to which it is connected. In order to resist the centrifugal force acting upon the magnet bars by reason of their rotation, a ring 19 may be fitted over the ends of the magnet bars where they are connected to the ring 16, and this ring is preferably also of good flux conducting material so as to also assist in providing a good magnetic path for the lines of force passing between the magnet bars at that end. At a point adjacent to but spaced from the other ends of the magnet bars, a suitable wire or strap 20 of non-flux conducting material may be wrapped around the bars and then its free ends united (see Figs. 1 and 3) so as to form in effect a ring which will prevent separation of the bars under the influence of centrifugal forces.

The cap 4, upon its inner face, is provided with a pair of abutments 21 (see Figs. 1 and 4) arranged at points on diametrically opposite sides of the axis of rotation of the cap, and a laminated core 22 of a suitable induced winding or coil 23 is confined against these abutments in any selected manner such as by bolts 24 which pass through the heads of the laminations and through the cap. The winding or coil may be wound directly upon the laminated core, or wound separately and the laminations divided and inserted separately into the coil. In both cases the coil will be supported upon the cap through its laminations. By reason of the clamping of the core directly against the abutments, the winding will not be jammed against the cap and thereby distorted or injured. Suitable insulating sleeves 25 may be provided upon the portions of the bolts 24 which pass through the laminations, and countersunk slightly into recesses 26 in the abutments, so as to prevent electrical contact between the laminations and the bolts. Suitable insulating washers 27 may also be provided upon the bolts between the heads 28 of the bolts and the core so as to prevent electrical contact between the head ends of the bolts and the core.

A plate 29 of hard insulating material is fitted upon pins 30 projecting from the heads of the bolts 24 at their inner ends, so as to form with the bolts a rigid frame, the insulating plate also preventing the formation of an electrical circuit between the inner ends of the bolts. This insulating plate is in close proximity to the magnet bar support 14 of the shaft 11, and the latter may be provided with a reduced end 31 which enters and has a bearing in the insulating plate, so as to always keep the plate and shaft in proper alignment relative to one another. The bearing in the insulating plate also prevents vibration of the shaft. This insulating plate may be made entirely of insulation, several such materials being now on the market and very hard, durable and self-lubricating, and having usually a base of fibre. Obviously a metallic bearing bushing could be mounted in the insulating plate for supporting the shaft if desired.

The cap, upon its inner face and between the abutments 21, is provided with arcuate columns 32 of non-magnetic material which extend along the sides of the coil or winding and have lateral flange portions 33 overlying and countersunk into the heads of the laminations so as to prevent displacement or removal of the laminations. The principal force tending to remove or displace the laminations is the magnetic drag or pull from the magnetic field and, while the bolts 24 would resist such removal, such bolts may be made much smaller when the laminations are also confined by the columns 32. Suitable strips 34 of insulation may be provided between the heads of the laminations and the flanged portions 33 so as to avoid electrical contact between the flanged portions and the laminations, and between the laminations through the flanged portions. Bolts 35 are also passed through the insulating plate 29 and the columns 32, and at their outer ends carry nuts 36, through which the plate 29 may be clamped to the columns, thereby forming a very rigid structure surrounding the winding.

It will be observed that the ends of the magnet bars which project beyond the support 14 on the shaft embrace the coil or winding and its core and extend approximately to the abutments against which the core is confined, so that the core will form a magnetic path for the lines of force passing between the adjacent projecting ends of the magnet bars. The magnet bars are arranged with opposite poles at corresponding ends of the casing, so that the two polar ends, embracing the winding, will be of opposite polarity. When the magnet bars are rotated, the polar ends will move about the winding, and by reason of the rotating magnetic field passing between the polar ends and through the winding, a current will be produced in the latter as understood in the art.

The magnet bars are made arcuate in a transverse direction so that their center of curvature will be substantially coincident with their axis of rotation. Each bar is preferably formed of two superposed strips of sheet magnetic steel which are cut and formed to the proper shape by suitable dies, since by this construction, their manufacture from sheet material is facilitated. That is, if the bars are made of integral material thick enough to provide the desired intensity, they would be difficult to cut and shape from sheet material by the usual dies, but by forming them of superposed strips they may be made from sheet stock material which may be readily worked by dies and stamping machinery. The superposed strips of these bars may be secured together in any suitable manner (not shown) and thus form, in effect, a single bar.

It is known that if a permanent magnet does not have a keeper or good magnetic path between its poles, continuously effective after magnetization, it will lose a considerable portion of its magnetism which loss frequently amounts to as much as 30%. It is very difficult to prevent this loss of magnetism in the magnet bars while the magnet is being assembled and before the core is inserted into position to provide a good path for the magnetic field. The same condition arises when, for any reason, it is necessary to remove the core after the machine has been assembled. Accordingly I have provided a construction by which this loss may be largely reduced or entirely prevented in a simple manner.

In accomplishing this object, I provide arcuate keepers 37 which are in the nature of wedges of good flux conducting material that may be inserted between the projecting polar ends of the magnet bars and around the space occupied by the columns 32 and the winding, thus forming arcuate continuations of the bars, which with the polar ends completely embrace and surround the winding and core. Such keepers will not interfere with the rotation of the magnet bars about the core and winding. The keepers may be provided with flanges 38 which overlap the outer faces of the polar ends of the magnet bars in order to prevent any possibility of the keepers tilting in their seats into positions in which they would enter the space enclosed by the bars. Thus, there will not be danger of the keepers becoming tilted or displaced into the space between the bars where they might injure the winding or laminations upon inadvertent rotation of the magnet bars.

In order to remove the keepers after the magnet has been completely assembled, the casing, at its open end, is provided with a pair of slots 39 which are normally overlapped and closed by the flange of the cap 4. The flange of the cap, however, is also provided with slots 40 which upon rotation of the cap may be brought into alignment with the slots 39 and thus provide windows through which the keepers may be removed after the magnet bars have been rotated into a position in which a keeper will be adjacent to and aligned with such open window. While two such windows are shown, it will be understood that in reality but one window is necessary, since the magnet bars may be rotated through a half revolution to bring either of the keepers in position in front of the window. After the keepers have been removed, the cap may be rotated upon the casing to carry these slots 40 out of alignment with the slots 39 and thus close the casing.

With this construction, after the bars have been magnetized, the magnetic path between them may be completed by the ring 16 and by the keepers 37 until the magneto is completely assembled. Then by rotating the cap, the keepers may be removed as explained, but the removal is accomplished only after the cap has been applied to the casing at which time the core will be in proper position between the polar ends of the magnet bars to provide a good path for the lines of force. When for any reason, it is necessary or desirable to disassemble the magneto or remove the winding, the cap may be rotated to bring its slots into alignment with the slots of the casing, after which the keepers may be applied to the polar ends of the magnet bars to carry the magnetic flux during the time the core is not in position to carry it. The keepers will, of course, be removed as soon as the core is replaced in the casing.

After the magneto has been in use for some time the magnet bars lose a considerable portion of their magnetism and it is very desirable that provision be made for remagnetization of the bars without their removal from the casing and without taking the magneto apart. Accordingly either one or both of the bars may be provided with a coil or winding 41, each of which at one end 42 is electrically connected or grounded to its magnet bar. The other end of each winding is electrically connected at 43 to a metallic conducting ring 44 mounted upon and surrounding the magnet bars upon an interposed ring 45 of insulation. It will be observed that both of the windings 41 are connected at corresponding ends to the ring 44 and at the other ends are grounded to the magnet bars and through them to the casing of the magneto.

With such a construction, if a magnetizing circuit including a source of current is grounded at one side to the casing and the other end of the circuit is connected to the ring 44, the magnetizing current will pass through the winding 41 and remagnetize the bars. For this purpose, of course, the windings will be in such directions upon the bars that the lines of force in the two bars will pass in opposite directions and produce poles at corresponding ends which are of opposite polarity. The keepers 37, or the core of the winding 23, and the ring 16 will provide a complete magnetic circuit for the magnet bars during this remagnetization. The casing is provided with one or more open windows or holes 46 through which the ring 44 will always be exposed in all rotative positions. It is therefore but a simple matter to insert an exposed end of a conductor included in a remagnetization circuit through the window 46 and into contact with the ring 44. The remagnetization in this manner also has another advantage in that there will not be a loss of magnetism after magnetization, and before complete assembly.

Any provision may be made for lubricating the bore 9 of the long bearing element 3 for the shaft, but such lubrication may be accomplished in a simple manner by providing the long bearing element 3 with a passage 47 extending from the cut away or enlarged portion 10 of the bore to a point in the surface of the bearing element within the tubular extension 2 where it communicates with a conduit 48 through which a lubricant may be forced. Such pressure of the lubricant may be obtained in any desired manner, but where the magneto is utlized in connection with explosion engines having a pressure lubricating system, the conduit 48 may be connected to this lubricating system for the supply of lubricant under pressure.

The casing may be provided upon its upper surface with suitable abutments 49 for supporting an induction coil or transformer 50 as usual in such devices.

A worm gear 51 is provided upon the reduced end 12 of the shaft 11, within the tubular extension 2 of the casing and in a cavity provided in the end of the bearing element 3, which gear meshes with and operates a worm screw provided upon a shaft 52 that is offset from the shaft 11 and extends transversely thereof. This shaft 52 extends into the interior of a distributor shell 53 and therein carries a pinion 54. A transverse partition 55 in the shell is provided with an aperture in which a bearing bushing 56 is mounted. A distributor shaft 57 passes through and has bearing in the bushing 56, and at one end also has a bearing in a cavity 58 in the casing. The distributor shaft is approximately parallel with its operating shaft 52 and carries a gear 59 which meshes with and is driven from the pinion 54 of the shaft 52. The gear 59 may be of fibre or other suitable material, so as to be comparatively noiseless in operation. A lubricant may be delivered to the bearing cavity 58 by means of a passage 60 leading to the cavity from a shallow well 61 in the casing, which well is located beneath the end of a pipe 62 entering a distributor shell from the exterior.

Figure 5:
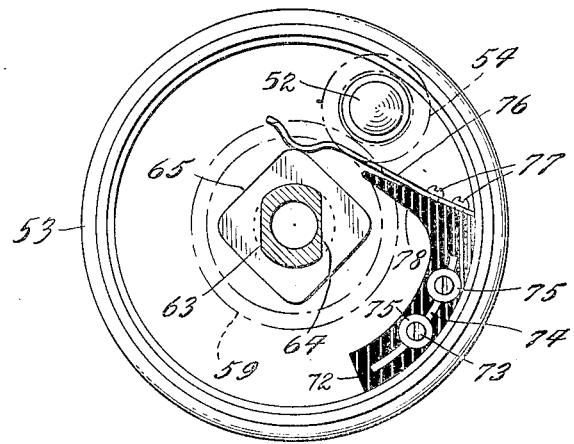
Fig. 5 is a top plan of the distributor shell with the cap removed.

The upper end of the distributor shaft 57 is provided upon its periphery with spaced flattened portions 63 and 64 (see Figs. 1 and 5 and over this upper end a cam 65 may be fitted so as to be rotatable therewith, and slidable thereon in an axial direction. This cam drops against a shoulder on the shaft which limits movement of the cam in one direction. A distributor brush 66 is fitted over the upper or free end of the distributor shaft 57 and confines the cam 65 against the shoulder of the shaft. A cover 67 of the distributor shell is provided with a socket terminal 68 for a supply lead from the coil or transformer 50 and this terminal bears upon a resilient finger 69 of the distributor brush so as to supply a high tension current to the brush in all rotative positions of the latter. The cover 67 is also provided with socket terminals 70 from which conductors lead to the several spark plugs or cylinders of the engine, and these socket terminals extend into the interior of the shell in position for cooperation with an arm 71 moving with and forming a part of the brush 66. As the brush rotates the socket terminals 68 will be connected successively with the socket terminals 70 as usual in distributor mechanism.

An insulating block 72 may be mounted upon the partition 55 in any suitable manner such as by screws 73 which pass through an arcuate slot 74 in the block (see Fig. 5) and into the partition. Suitable washers 75 may be provided upon the screws and overlying the block so that when the screws are tightened, the insulating block will be clamped to the partition. The center of curvature of the arcuate slot 74 is approximately at the axis of rotation of the distributor shaft 57, so that by loosening the screws 73, the insulating block may be adjusted to a limited extent angularly about the axis of the distributor shaft 57 and then clamped in adjusted position by a tightening of the screws.

A contact finger or spring 76 may be secured in a suitable manner such as by screws 77 to a slightly oblique end wall of the insulating block 72, with the free end of the spring or finger projecting into the path of the corners of the cam 65. This spring or finger will thus be engaged and flexed outwardly slightly and released, successively during the rotation of the cam with the distributor shaft. To prevent movement of the spring or finger too far inwardly when released by the corners of the cam, the insulating block 72 may, at the end carrying the spring or finger, have a toe or extension 78 running along the finger and serving as a stop therefor. This toe, however, does not project into the path of the travel of the cam.

A suitable circuit lead wire (not shown) may be connected to the spring or finger 76 in any suitable manner, such as beneath one of the screws 77, and then conducted out of the shell 53 through any suitable aperture and thence to the primary of the usual induction or transformer coil. The other end of the primary of the induction or transformer coil is connected to a source of current, as usual, which has one terminal grounded to the casing, with the result that during the time the cam 65 is in engagement with the spring or finger 76, the primary circuit will be closed. The instants in the cycle of operation at which the making and breaking of this primary circuit is accomplished, may be varied to some extent by the angular adjustment of the insulating block 72.

The current induced in the winding of the magneto is an alternating current and may be connected to the induction coil 50 without the use of a current making and breaking device since the distributor rotates in proper timed relation to the rotation of the magnet bars, and the current will be induced in the relatively stationary winding at such times when the distributor brush is in position to distribute to the cylinders the induced stepped-up current from the secondary of the transformer coil. The cam 65 and the spring or finger 76 are provided to enable the use of a battery for starting purposes, during which time the primary circuit of the induction or transformer coil will be controlled by the cam 65. The battery could be used for ignition purposes through any interval, if desired, but since the use of the magneto is preferably for this purpose, the battery will normally be used solely for starting purposes.

In the operation of the magneto it is connected as usual in prior devices, the shaft 11 being driven from a suitable part of the engine at a definite ratio of speed with respect thereto. This shaft in rotating will rotate the magnet bars about the relatively stationary winding 23 and induce therein an alternating current which is conducted to the usual induction or transformer coil 50 and the stepped-up current therefrom then distributed to the various cylinders of the engine. The advancement or retardation of the spark may be accomplished to some extent by the angular adjustment of the winding 23 which is produced by a partial rotation of the cap 4 upon the casing of the magnet. By thus changing the angular position of the core of the winding, the instants at which the peak of the current will be induced may be varied to some extent.

When the magnet bars lose their magnetism or become considerably weakened, any person, skilled or unskilled, may readily remagnetize them in a simple manner by passing the magnetizing current through the winding 41 in the manner hereinbefore explained. By such a remagnetization, there will be little or no immediate loss of the magnetism since the magnetic path is practically completed throughout the operation as well as after it. In the event that it is necessary to take the magneto apart, the keepers 37 may be applied to the polar ends so that no loss of magnetism will result. With this construction, the use of slip rings and brushes is avoided, and all of the advantages of such a magneto are obtained with few or none of the disadvantages. Such a magneto is so compact and so proportioned that it occupies practically the same space required for magnetos utilizing a stationary field and rotative armature.

It will be obvious that various changes in the details and arrangement of parts in the magneto which has been herein described and illustrated for the purpose of explaining the nature of the invention, may be made by those skilled in the art within the principle and scope of the invention as expressed in the appended claims.

I claim:—

1. A magneto comprising a casing having an elongated bearing extending axially into the casing and rigidly connected to one end thereof, a shaft passing through and rotatably mounted in the bearing and having a radially extending support on its inner end, a pair of magnet bars secured intermediate of their ends to the radial support and extending substantially parallel to the shaft, and a stator member having an induced winding thereon disposed in the space between the bars beyond the support.

2. A magneto comprising a casing having an elongated bearing extending axially into the casing and rigidly connected to one end thereof, a shaft passing through and rotatably mounted in the bearing and having a radially extending support on its inner end, a pair of magnet bars secured intermediate of their ends to the radial support and extending substantially parallel to the shaft, a stator member having an inductor winding thereon disposed in the space between the bars beyond the support, and a ring of magnetic material connecting the other ends of the bars and bearing externally on said elongated bearing.

3. A magneto comprising a casing having an elongated bearing extending axially into the casing and rigidly connected to one end thereof, a shaft passing through and rotatably mounted in the bearing and having a radially extending support on its inner end, a pair of magnet bars secured intermediate of their ends to the radial support and extending substantially parallel to the shaft, a stator member having an inductor winding thereon disposed in the space between the bars beyond the support, and a mounting for said stator member carried by the casing for rotation about the axis of rotation of the magnet bars.

4. A magneto comprising a casing having an elongated bearing extending axially into the casing and rigidly connected to one end thereof, a shaft passing through and rotatably mounted in the bearing and having a radially extending support on its inner end, a pair of magnet bars secured intermediate of their ends to the radial support and extending substantially parallel to the shaft, a stator member having an inductor winding thereon disposed in the space between the bars beyond the support, and a mounting for said stator member comprising a cap having a flange in telescopic engagement with the adjacent end of the casing and rotatable thereon about the axis of rotation of the magnet bars.

5. A magneto comprising a casing having an elongated bearing extending axially into the casing and rigidly connected to one end thereof, a shaft passing through and rotatably mounted in the bearing and having a radially extending support on its inner end, a pair of magnet bars secured intermediate of their ends to the radial support and extending substantially parallel to the shaft, a stator member having an inductor winding thereon disposed in the space between the bars beyond the support, a ring of magnetic material connecting the other ends of the bars and bearing externally on said elongated bearing, and straps encircling both bars for preventing their separation under the centrifugal forces of rotation.

6. A magneto comprising a casing having a long bearing member extending inwardly from one end, a shaft rotatable in said bearing member, a support carried by the inner end of the shaft and abutting the end of the bearing member, a pair of magnet bars secured intermediate their ends to diametrically opposite sides of said support so as to extend parallel with the shaft and in both directions from said support, and a stator coil mounted in the casing with its core ends in proximity to the path of travel of the projecting ends of the bars, whereby a current will be induced in the stator coil by the moving magnetic field between the projecting ends of the bars.

7. A magneto comprising a casing having a long bearing member extending inwardly from one end, a shaft rotatable in said bearing member, a support carried by the inner end of the shaft and abutting the end of the bearing member, a pair of magnet bars secured intermediate their ends to diametrically opposite sides of said support so as to extend approximately parallel with the shaft and in both directions from said support, and a stator coil mounted in the casing beyond the end of the shaft and located in the space between the projecting ends of the bars and with the core extending radially of the path of travel of the bars, whereby a current will be induced in the stator coil by the moving magnetic field between the projecting ends of the bars.

8. A magneto comprising a casing having a long bearing member extending inwardly from one end, a shaft rotatable in said bearing member, a support carried by the inner end of the shaft and abutting the end of the bearing member, a pair of magnet bars secured intermediate their ends to diametrically opposite sides of said support so as to extend parallel with the shaft and in both directions from said support, a stator coil mounted in the casing so as to extend between the projecting ends of the bars and with the core of the coil disposed radially of the path of travel of the bars, whereby a current will be induced in the stator coil by the moving magnetic field between the projecting ends of the bars, and means for giving the coil an adjustment angularly in the magnetic field passing through it, whereby the instant in the cycle of operations where the peak of the wave is generated may be varied.

9. A magneto comprising a casing having a long bearing member extending inwardly from one end, a shaft rotatable in said bearing member, a support carried by the inner end of the shaft and abutting the end of the bearing member, a pair of magnet bars secured intermediate their ends to diametrically opposite sides of said support so as to extend parallel with the shaft and in both directions from said support, a member carried by the other end of the casing for rotation about the axis of rotation of said shaft, and a stator coil secured to and rotating with said member, and projecting into the space adjacent the support with which the bars rotate, with the core of the coil disposed substantially radially of the path of travel of the bars and at their projecting ends, so that a current will be induced in the stator coil by the moving magnetic field between the projecting ends of the bars, the rotation of the member carrying with it the stator coil to vary the instant in the cycle of operations where the peak of the wave is generated.

10. A magneto comprising a casing, a stator coil mounted in the casing with its core ends exposed, a shaft rotatable in said casing, a pair of substantially straight magnet bars carried by the shaft so as to extend endwise thereof with their corresponding ends of opposite polarity and the poles at the ends adjacent the stator coil passing concomitantly in close proximity to the core ends so as to induce a current in the stator coil, and a flux conducting member connecting the poles at the ends opposite from the stator coil to make a horse shoe magnet of the bars.

11. A magneto comprising a casing, a stator coil mounted in the casing with its core ends exposed, a shaft rotatable in said casing, a pair of substantially straight magnet bars carried by the shaft so as to extend endwise thereof with their corresponding ends of opposite polarity and the poles at the ends adjacent the stator coil passing concomitantly in close proximity to the core ends so as to induce a current in the said coil, and a ring of good flux conducting material connecting the poles at the ends opposite from the said coil to make a horse shoe magnet of the bars and tie them together.

12. A magneto comprising a casing, a stator coil mounted in the casing with its core ends exposed, a shaft rotatable in said casing, a pair of substantially straight magnet bars carried by the shaft so as to extend endwise thereof with their corresponding ends of opposite polarity and the poles at the ends adjacent the stator coil passing concomitantly in close proximity to the core ends so as to induce a current in the stator coil, and a ring of good flux conducting material which the bars overrun and to which they are secured, at the ends opposite from the stator coil, said ring having a flange at the outer end which overlies and abuts the adjacent ends of the bars to complete the flux path between the bars.

13. A magneto comprising a casing, a stator coil mounted in one end of the casing, a shaft rotatable in the other end of the casing, magnet bars carried by the shaft within the casing so as to extend in a direction endwise thereof and with their corresponding poles of opposite polarity, the polar ends adjacent the stator coil passing in close proximity to the core ends of the said coil so as to induce therein a current, and a conductor wound around one of the bars so as to magnetize the latter when a current is passed therethrough, one end of the conductor being grounded to the magnet bar, and an exposed contact rotating with the bars and to which the other end of the conductor is connected, whereby a grounded magnetizing circuit may be connected to the exposed contact to pass a magnetizing current through the conductor.

14. In a magneto, a casing having a flanged cap rotatably fitting over and closing one end thereof, an inductor winding mounted on the inner face of the cap with its core transverse to the axis of the cap, and a magnet device for producing a magnetic field rotatably mounted in said casing with polar ends embracing and rotating about the core of said winding, whereby the magnetic flux between the rotating polar ends will pass alternately in opposite directions through said core and induce an electric current in the said winding.

15. In a magneto, a casing having a flanged cap rotatably fitting over and closing one end thereof, an inductor winding mounted on the inner face of the cap with its core transverse to the axis of the cap, and a magnet device for producing a magnetic field rotatably mounted in said casing with polar ends embracing and rotating about the core of said winding, whereby the magnetic flux between the rotating polar ends will pass alternately in opposite directions through said core and induce an electric current in said winding, said cap when adjusted rotatably upon the casing carrying the winding angularly so as to vary the point in the cycle of operation where the peak of the current wave will be generated.

16. In a magneto, a casing having a flanged cap rotatably fitting over and closing one end thereof, an inductor winding mounted on the inner face of the cap with its core transverse to the axis of the cap, a magnet device for producing a magnetic field rotatably mounted in said casing with polar ends embracing and rotating about the core of said winding, whereby the magnetic flux between the rotating polar ends will pass alternately in opposite directions through said core and induce an electric current in said winding, keepers insertable between the polar ends so as to surround without entering the space occupied by the winding and its core, the overlapping portions of the cap and casing walls having cooperating slots which may be brought into or out of alignment with one another by rotation of the cap and through which, when aligned, said keepers may be inserted between said polar ends or removed.

17. In a magneto, a casing, an inductor winding removably mounted in one end thereof with its core transverse to the axis of the casing, a magnet device for producing a magnetic field rotatably mounted in the casing at the other end and having polar ends embracing and rotating about the core of the winding, said polar ends being arcuately curved around the winding, and keepers insertable between the polar ends so as to complete an arcuate enclosure about the winding and still permit removal of the winding, said casing having an opening through which the keepers may be removed or introduced between the polar ends.

18. The magneto substantially as set forth in claim 17 in which the keepers are provided with flanges fitting against the outer faces of the polar ends so as to be held thereby against displacement into the zone occupied by the induced winding.

19. In a magneto, an inductor winding and a magnet device capable of producing a magnetic field, movable relatively to one another so as to cause the induction of a current in said winding, said magnet device including permanent magnet bars bent into a transversely arcuate shape, said bars each being formed of superposed sections fitting face to face so as to facilitate their formation by dies from stock sheet material.

20. In a magneto, a casing having a flanged cap fitting one end thereof, said cap having abutments on the inner face thereof, a laminated core facing against said abutments, a coil surrounding said core, members extending from the inner face of the cap along the sides of the coil and flanged over the edges of the ends of the laminations to hold them within the coil, means for securing the laminated core against the abutments, and a magnet device rotatable in said casing for passing a magnetic flux through said core alternately in opposite directions to induce a current in said coil.

21. In a magneto, a casing having a flanged cap fitting one end thereof, said cap having abutments on the inner face thereof, a laminated core facing against said abutments, a coil surrounding said core, members extending from the inner face of the cap along the sides of the coil and flanged over the edges of the ends of the laminations to hold them within the coil, studs passing through said laminated core into the cap to secure the core against the abutments, means carried by said members for insulatingly connecting the free ends of the studs and insulating them from one another, and a magnet device rotatable in said casing for passing a magnetic flux through said core alternately in opposite directions to induce a current in said coil.

22. In a magneto, a casing, means within the casing for generating a current and including an operating shaft, a second shaft geared to the operating shaft and extending transversely to one side of the casing, a distributor shell mounted on the casing over the second shaft and having a transverse member in its interior, a stub spindle rotatably mounted in said transverse member and the casing, gearing between the second shaft and spindle, a cam on said spindle and rotatable therewith, a contact finger mounted in the shell for angular adjustment about the cam, a distributor brush also mounted on the spindle, and contacts in the shell with which the brush cooperates successively.

23. In a magneto, a casing having a flanged cap fitting one end thereof, said cap having abutments on the inner face thereof, a laminated core facing against said abutments, a coil surrounding said core, members extending from the inner face of the cap along the sides of the coil and flanged over the edges of the ends of the laminations to hold them within the coil, studs passing through said laminated core into the cap to secure the core against the abutments, means carried by said members for insulatingly connecting the free ends of the studs and insulating them from one another, and a magnet device rotatable in said casing for passing a magnetic flux through said core alternately in opposite directions to induce a current in said coil, said magnet device also having a bearing in said insulating means.

24. In a magneto, a casing having a cap removably applied to one end, a winding secured to the inner face of the cap, columns on the inner face of the cap extending lengthwise of the casing beyond the winding, a member of insulating material connecting said columns, a rotatable shaft having bearing in said casing and said member, and a magnet device carried by the shaft with polar ends projecting along the winding and columns and rotatable therearound with the shaft for passing a magnetic flux through the winding alternately in opposite directions to induce a current in said winding.

25. An electric generator comprising a casing having an elongated bearing extending axially into the casing and rigidly connected to one end thereof, a shaft passing through and rotatably mounted in the bearing and having a radially extending support on its inner end, a pair of magnet bars secured intermediate of their ends to the radial support and extending substantially parallel to the shaft, a stator coil mounted in the casing so as to extend between the projecting ends of the bars and with the core of the coil disposed radially of the path of travel of the bars, whereby a current will be induced in the stator coil by the moving magnetic field between the projecting ends of the bars, and a cap for the casing mounted for rotation thereon opposite said elongated bearing furnishing the mounting for said coil to provide means for giving the coil an adjustment angularly in the magnetic field passing through it, whereby the instant in the cycle of operations where the peak of the wave is generated may be varied.

In witness whereof, I hereunto subscribe my signature.

RICHARD VARLEY.